United States Patent [19]
Lee et al.

[11] Patent Number: 6,121,871
[45] Date of Patent: Sep. 19, 2000

[54] APPARATUS AND METHOD FOR COMPARING DIGITAL WORDS USING A LAST BIT DETECTION OPERATION

[75] Inventors: Lan Lee, Palo Alto; Cong Khieu, San Jose, both of Calif.

[73] Assignee: Sun Microsystems, Inc., Palo Alto, Calif.

[21] Appl. No.: 09/260,583

[22] Filed: Mar. 1, 1999

[51] Int. Cl.⁷ .................................................. G05B 1/00
[52] U.S. Cl. ......................................................... 340/146.2
[58] Field of Search ........................................... 340/146.2

[56] References Cited

U.S. PATENT DOCUMENTS

| | | | |
|---|---|---|---|
| 5,319,347 | 6/1994 | McClure | 340/146.2 |
| 5,754,569 | 5/1998 | De Lange | 371/67.1 |

*Primary Examiner*—Margaret R. Wambach
*Attorney, Agent, or Firm*—Pennie & Edmonds LLP

[57] ABSTRACT

A circuit for comparing two digital words has a set of bit compare circuits that generate a set of compare signals. Each bit compare circuit receives a first bit from a first digital word and a corresponding bit from a second digital word and generates one compare signal that indicates a match between the first bit and the corresponding bit. In response to the set of compare signals, a composite match detector circuit generates a composite match signal. A last bit detector circuit generates a last bit signal that indicates a match between a last bit from the first digital word and a last bit from the second digital word. When the last bit signal is received, a match hit generator circuit generates a match hit signal based on the composite match signal and the last bit signal.

20 Claims, 8 Drawing Sheets

APPARATUS AND METHOD FOR COMPARING DIGITAL WORDS USING A LAST BIT DETECTION OPERATION

BRIEF DESCRIPTION OF THE INVENTION

This invention relates generally to computer devices that compare digital words to determine whether they are equivalent and valid. More particularly, this invention relates to a high speed digital word comparator with a last bit detection function such that the comparator generates a match signal when the last bit has been detected.

BACKGROUND OF THE INVENTION

A digital value or bit has one of two states—zero or one. A digital word is a sequence of digital values or bits. By way of example, a sixteen bit digital word may look as follows: 0100111001010110. Computers operate by processing digital words. It is frequently necessary for a computer to compare two digital words to determine whether they are identical. For example, the comparison operation is necessary when processing addresses of a computer program. A digital word comparator is used in this situation to determine whether a specified address in a computer program matches an address at a cache memory location.

The comparison of two digital words must identify whether each bit in a first digital word is identical to a corresponding bit in a second digital word. Thus, if the two bits have identical values (they are both zero or they are both one) then a match exists. If a match does not exist (one bit is zero and the other bit is one, or one bit is one and the other bit is zero), then the comparison operation fails. The foregoing logical processing can be characterized as an exclusive-or operation. This processing can be summarized as follows:

| "EXCLUSIVE-OR" TRUTH TABLE FOR A COMPARISON OPERATION | | |
| --- | --- | --- |
| BIT 1 | BIT 2 | OUTPUT |
| 0 | 0 | 0 |
| 0 | 1 | 1 |
| 1 | 0 | 1 |
| 1 | 1 | 0 |

In the exclusive-or operation, the output is a zero when bit one and bit two match. Using an exclusive-or operation, for a match to exist between two digital words, all comparison operations must be satisfied. In other words, a logical zero value must be produced by all of the comparison operations. If this occurs, then a match hit signal is generated, otherwise a match miss signal is generated.

Typical processing variations result in different timing and delay characteristics for comparators. This is a problem because the output for each comparison operation is required at the same time. Thus, design complexity increases as efforts are made to produce uniform timing and delay characteristics among distinct logical circuits. This design complexity is typically accompanied by circuit fabrication complexity.

One prior art comparator performs the compare operation in response to an externally generated enable signal. In this prior art comparator, the input data signals meet predetermined setup and hold time requirements with respect to a clock edge. After the enable signal is generated, a mass compare operation simultaneously performs an exclusive-or operation between corresponding bits in the two digital words. To meet the predetermined setup and hold time requirements, additional complex circuitry is required to generate the enable signal. Moreover, having to meet predetermined setup and hold time requirements may cause the comparator to generate false match hit signals or false match miss signals in extreme cases.

Since the operation of comparing digital words is so prevalent in a computer, it is important to perform it efficiently. Efficiency continues to grow in importance as processors and memories operate at ever-increasing speeds.

In view of the foregoing, it would be highly desirable to provide a method and apparatus for performing a compare operation that operates at a faster speed and that accommodates variations in extreme cases. Such a circuit would reduce timing and delay problems. In addition, such a circuit would reduce design complexity and be easier to fabricate. Preferably, the circuit would operate at a high speed and would reduce the number of transistors needed for implementation.

SUMMARY OF THE INVENTION

A method and apparatus for comparing digital words uses a last bit signal to time the comparison that generates a match signal (i.e., a match hit signal or a match miss signal). Since the last bit signal is generated from the data that is being compared, the invention improves the tolerance of the process variation in extreme cases and reduces the number of false match hit signals and false match miss signals.

In particular, a circuit for comparing two digital words has a set of bit compare circuits that generate a set of compare signals. Each bit compare circuit receives a first bit from a first digital word and a corresponding bit from a second digital word and generates one compare signal that indicates a match between the first bit and the corresponding bit. In response to the set of compare signals, a composite match detector circuit generates a composite match signal. A last bit detector circuit generates a last bit signal that indicates a match between a last bit from the first digital word and a last bit from the second digital word. When the last bit signal is received, a match hit generator circuit generates a match hit signal based on the composite match signal and the last bit signal.

The invention more efficiently performs a comparison operation between two digital words by generating a last bit signal from a comparison of the last bit from the two digital words and deriving a match signal after the last bit signal has been generated. In this way, performance is improved. The invention thereby more effectively compares two digital words by reducing false hits and misses. Another advantage is that the invention is tolerant of processing variations because it operates synchronously with the comparison of the last bits from the two digital words. In this way, the last bit signal will track process variation in the decoders of the memory sense amplifiers and will not generate false hits and misses. Furthermore, when implemented, the invention reduces circuit complexity.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
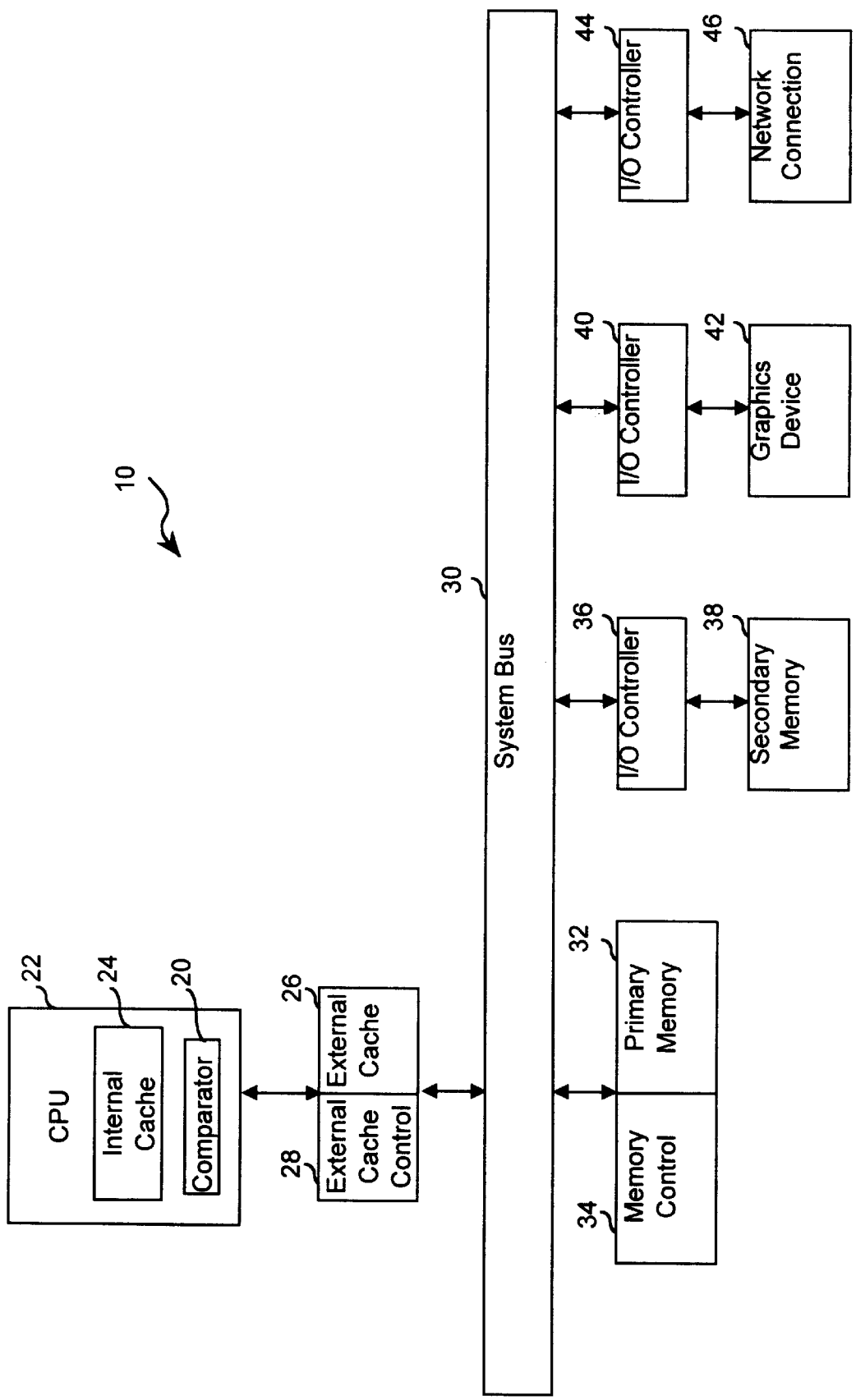
FIG. 1 illustrates a general purpose computer incorporating the digital word comparator of the invention.

FIG. 1 illustrates a general purpose computer 10 incorporating the digital word comparator 20 of the invention in the central processing unit (CPU) 22. However, the digital word comparator 20 may be implemented in any number of the devices shown in FIG. 1. By way of example, the digital word comparator 20 may be used in the internal cache 24 of the CPU 22.

As known in the art, the CPU 22 executes instructions of a computer program. Each instruction is located at a memory address. Similarly, the data associated with an instruction is located at a memory address. The CPU 22 accesses the specified memory address to fetch the instruction or data stored there.

Most CPUs 22 include an on-board memory called an internal cache 24. The internal cache 24 stores a set of memory addresses and the instructions or data associated with the memory addresses. The digital word comparator 20 is used to identify whether a required memory address exists in the internal cache 24.

If a specified address is not in the internal or L1 cache 24, the CPU 22 looks for the specified address in an external cache 26, also called an L2 cache. The external cache 26 has an associated external cache controller 28. The external cache controller 28 may also use the digital word comparator 20 of the invention.

If the address is not in the external cache 26 (a cache miss), the external cache controller 28 requests access to a system bus 30. When the system bus 30 becomes available, the external cache controller 28 is allowed to route its address request to the primary memory 32. The primary memory 32 has an associated memory controller 34. The memory controller 34 queries the primary memory 32 for the subject address. If the subject address exists in primary memory 32, the data output from the primary memory 32 is applied to the system bus 30. From the system bus 30, the data is stored in the external cache 26 and is passed to the CPU 22 for processing.

The foregoing processing is performed for every address request. If the address request is not found in the primary memory 32, similar processing is performed by an input/output controller 36 with the secondary memory 38.

As shown in FIG. 1, additional devices connect to the system bus 30. For example, FIG. 1 illustrates an input/output controller 40 operating as an interface between a graphics device 42 and the system bus 30. In addition, the figure illustrates an input/output controller 44 operating as an interface between a network connection circuit 46 and the system bus 30. Although the digital word comparator 20 may be used in any of the devices shown in FIG. 1, the digital word comparator 20 of the invention finds its largest applicability in the internal cache 24 of the CPU 22 and the external cache controller 28 of the external cache 26.

Figure 2:
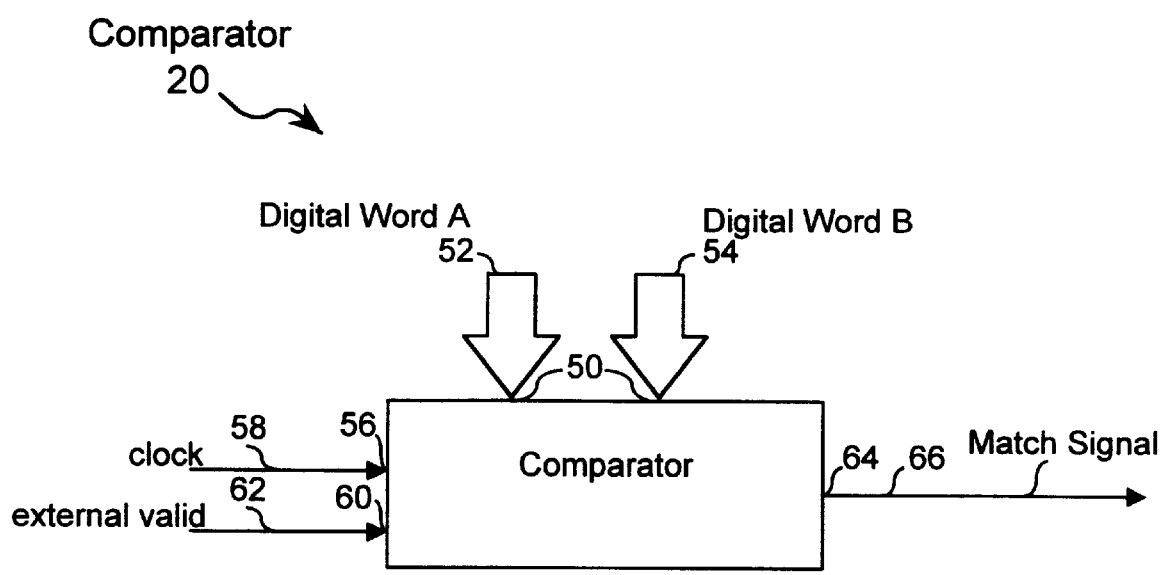
FIG. 2 is a general illustration of the inputs and output of the digital word comparator of the invention.

FIG. 2 is a general illustration of a digital word comparator 20 in accordance with the invention. The digital word comparator 20 includes input nodes 50 that are used to receive a first digital word (Digital Word A) from a bus 52 and a second digital word (Digital Word B) from a bus 54. The comparator 20 also includes a clock input node 56 to receive a clock signal from line 58. The comparator 20 includes an external valid node 60 to receive an external valid signal from line 62. The comparator 20 includes an output node 64 for applying a match hit or a match miss signal on line 66.

Figure 3:
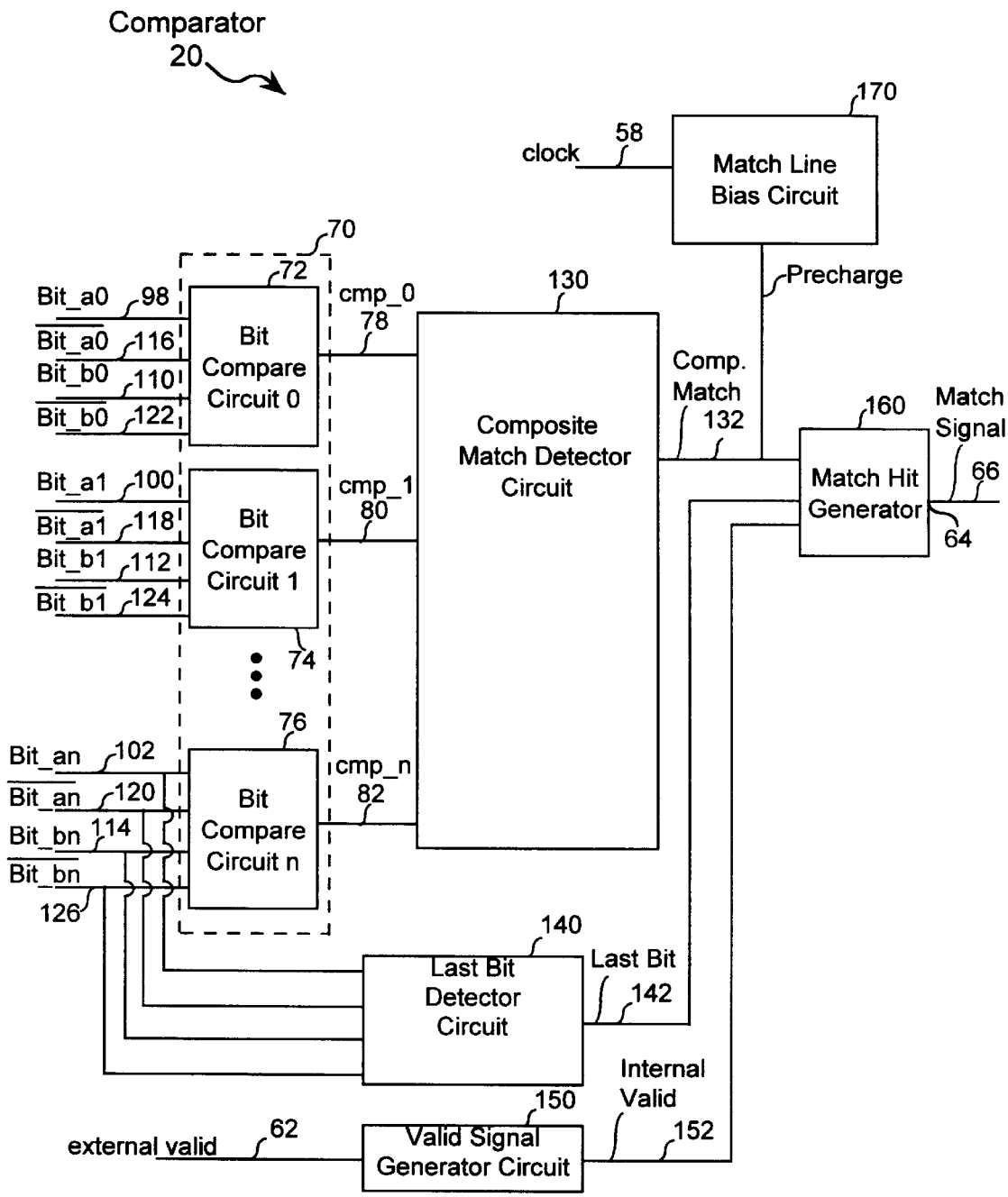
FIG. 3 illustrates the circuits that are used to construct the digital word comparator in accordance with an embodiment of the invention shown in FIG. 2.

FIG. 3 is a more detailed illustration of the digital word comparator 20 of FIG. 2. In particular, FIG. 3 illustrates that the digital word comparator 20 includes a set 70 of bit compare circuits 72, 74 and 76, Bit Compare Circuit 0, Bit Compare Circuit 1, . . . , Bit Compare Circuit N, that generate a set of compare signals, cmp_0, cmp_1, . . . , cmp_n, on lines 78, 80, and 82, respectively. Each bit compare circuit 72–76 receives a first bit, Bit_a0, Bit_a1, . . . , Bit_an, from the first digital word on lines 98, 100, and 102, respectively, and a second bit Bit_b0, Bit_b1, . . . , Bit_bn, on lines 110, 112, and 114, respectively, from the second digital word.

In this description, the following notation will be used: Bit_a0 refers to bit zero of the first digital word, digital word A, while Bit_an refers to the last or n'th bit of the first digital word. Similarly, Bit_b0 refers to bit zero of the second digital word, digital word B, while Bit_bn refers to the last bit of the second digital word. In addition, the logical complement of a signal will have a bar above the signal name. For example, the complement of Bit_a0 is $\overline{Bit\_a0}$. In the embodiment shown in FIG. 3, each bit compare circuit 72–76 receives the bits to be compared and their complements. The complements of the bits of the first digital word, $\overline{Bit\_a0}$, $\overline{Bit\_a1}$, and $\overline{Bit\_an}$, are received on lines 116, 118 and 120, respectively. The complements of the bits of the second digital word, $\overline{Bit\_b0}$, $\overline{Bit\_b1}$, and $\overline{Bit\_bn}$, are received on lines 122, 124 and 126, respectively. For example, bit compare circuit 0 72 receives Bit_a0, $\overline{Bit\_a0}$, Bit_b0, and $\overline{Bit\_b0}$, on lines 98, 116, 110 and 122, respectively.

In an alternate embodiment, each bit compare circuit 72, 74, 76 receives bits, Bit_a0, Bit_a1, . . . , Bit_an of the first digital word, and bits, Bit_b0, Bit_b1, . . . , Bit_bn, respectively, of the second digital word and generates the complement of each of the bits internally.

A composite match detector circuit 130 generates a composite match signal, Comp. Match, on line 132 in response to the set of compare signals, cmp_0, cmp_1, . . . , cmp_n, on lines 78, 80, and 82, respectively.

In a noteworthy aspect of the invention, a last bit detector circuit 140 generates a last bit signal on line 142 that indicates a match between the last bit from the first digital word, Bit_an, and the last bit from the second digital word, Bit_bn. In a preferred implementation, the last bits from the first and second digital words, Bit_an and Bit_bn, are received either concurrently with or after the lower order bits. In other words, the last bits, Bit_an and Bit_bn, take the most amount of time to receive. In this way, using the slowest data bits, the comparator 20 operates synchronously with the data as the slowest data is received. Therefore, the present invention eliminates the need for a separate external enable signal generator and is tolerant of process variation in extreme cases to prevent the generation of false match hit signals and false match miss signals as the comparator speed increases or decreases.

A valid signal generator circuit 150 receives the external valid signal on line 62 and generates an internal valid signal on line 152.

A match hit generator circuit 160 generates the match hit signal on line 66 based on the composite match signal, the internal valid signal and the last bit signal when the last bit signal is received.

In addition, a match line bias circuit 170 is coupled to the match hit generator circuit 160 and the composite match detector circuit 130. The match line bias circuit 170 receives the clock signal on line 58 and outputs a precharge signal on line 132 to precharge the composite match signal to a predetermined logical value.

An Exemplary Embodiment

Figure 4:
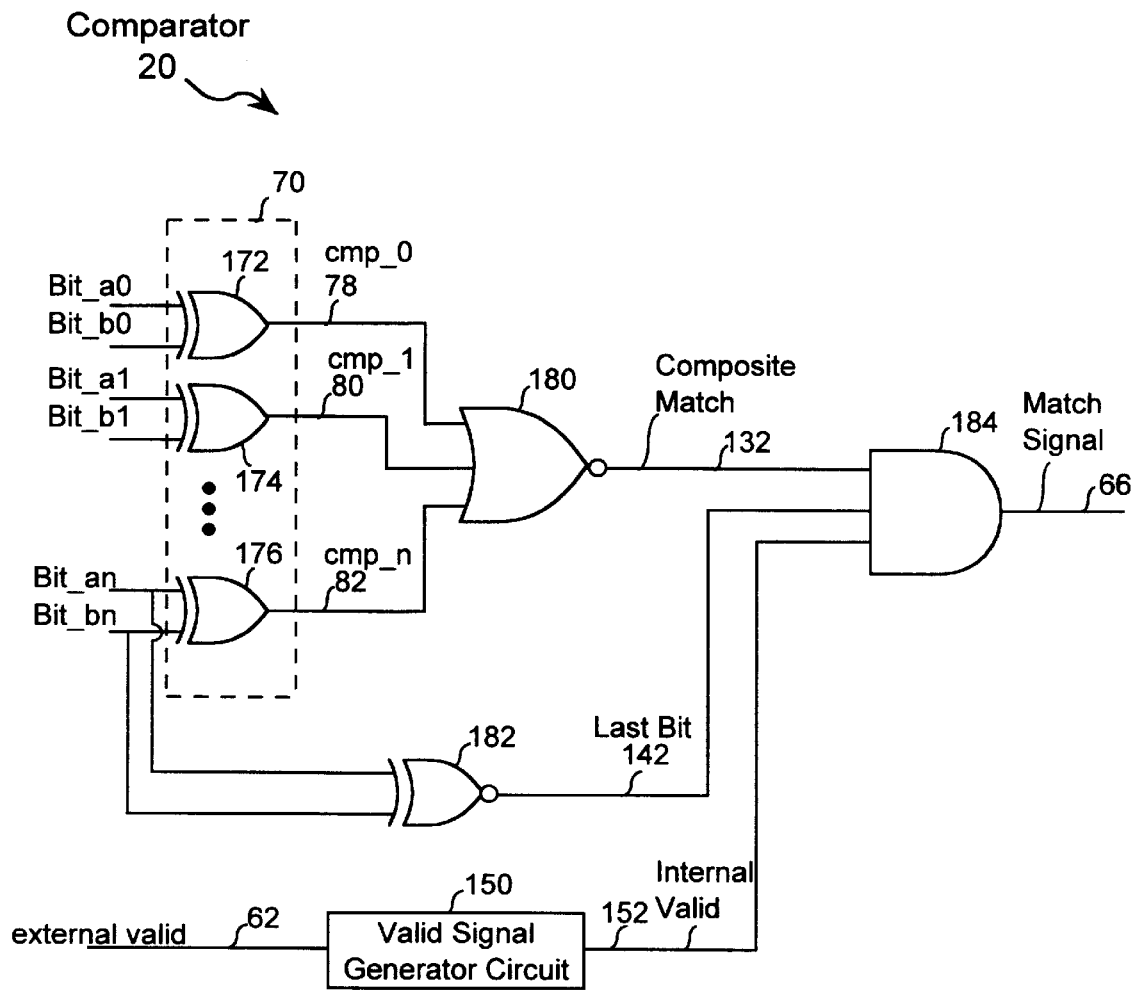
FIG. 4 is an exemplary digital word comparator constructed in accordance with an embodiment of the invention shown in FIG. 3.

FIG. 4 is an exemplary digital word comparator 20 constructed in accordance with an embodiment of the invention shown in FIG. 3. In this embodiment, since the match line bias circuit is omitted and the valid signal generator circuit 150 is the same as in FIG. 3, these circuits will not be described with respect to FIG. 4. In this embodiment, the bit compare circuits 72, 74 and 76 are exclusive-or gates 172, 174 and 176, respectively, that identify whether a bit in a first digital word is identical to a corresponding bit in a second digital word. If the two bits have identical values (they are both zero or they are both one) then a match exists and the exclusive-or gate 172, 174, 176 outputs a logical zero. If a match does not exist (one bit is zero and the other bit is one), then the comparison operation fails and a logical one is output.

For a match to exist between two digital words, all comparison operations must be satisfied. In other words, a logical zero value must be produced by all of the comparison operations. If this occurs, then a match hit signal will be generated, otherwise a match miss signal will be generated.

In the embodiment of FIG. 4, the composite match detector circuit is implemented as a NOR gate 180. When any of the cmp_0, cmp_1 and cmp_n signals has a logical one value which indicates a mismatch, the NOR gate 180 outputs a composite match signal having a logical zero value. However, when all of the cmp_0, cmp_1 and cmp_n signals have a logical zero value which indicates a match hit, the NOR gate 180 outputs a composite match signal having a logical one value.

The last bit detector circuit is implemented as an exclusive-nor gate 182. This exclusive-nor gate 182 outputs a logical one value when the last bits, Bit_an and Bit_bn, match, and outputs a zero otherwise.

The match hit generator is implemented as an AND gate 184. When the AND gate 184 receives an internal valid signal having a logical one value, a last bit signal having a logical one value, and a composite match signal having a logical one value, the AND gate generates a match hit signal having a logical one value on line 66. When any of the internal valid signal, the last bit signal and the composite match signal have a logical zero value, the AND gate 184 outputs a match miss signal having a logical zero value on line 66.

The Bit Compare Circuits

Figure 5:
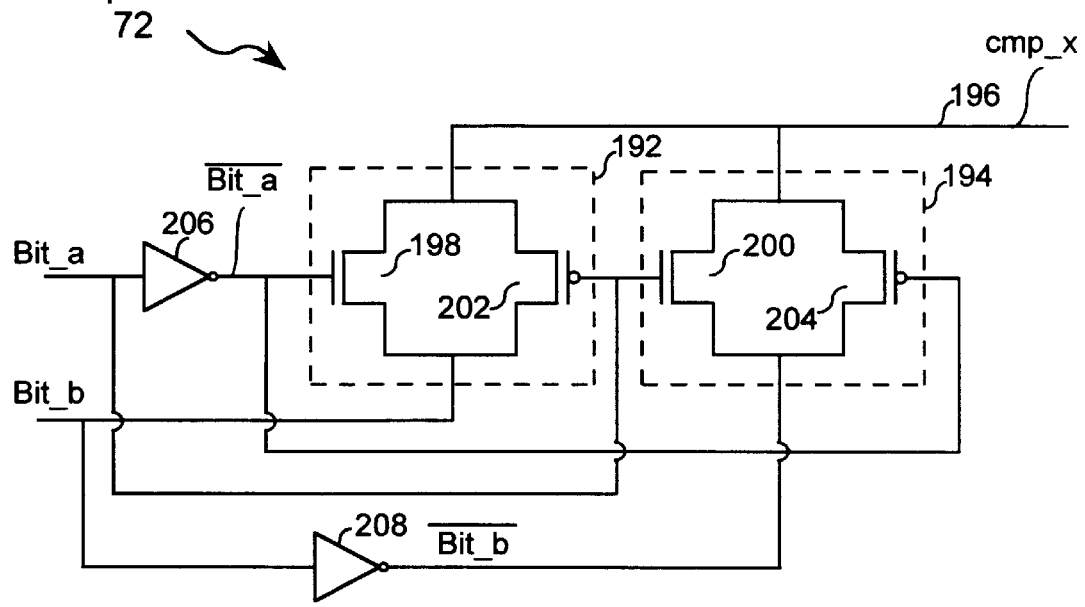
FIG. 5 illustrates a bit compare circuit constructed in accordance with an embodiment of the invention shown in FIG. 3.

FIG. 5 illustrates a bit compare circuit 72 constructed in accordance with an embodiment of the invention shown in FIG. 3. Bit compare circuits 74–76 are the same as bit compare circuit 72. The bit compare circuits 72–76 operate as exclusive-or gates according to the truth table described above. In other words, the bit compare circuits 72–76 output a logical zero value when Bit_a and Bit_b match. Each bit compare circuit 72–76 includes first and second transistor pairs 192, 194, respectively. The first and second transistor pairs 192, 194 are connected together at one end to output a comparison signal cmp_x on line 196. By way of example, for Bit_a0 and Bit_b0, cmp_x means cmp_0. In other words, the "x" refers to the bit number. Each transistor pair 192, 194 has an NMOS transistor 198, 200 connected in parallel to a PMOS transistor 202, 204. In the first transistor pair 192, the complement of a bit signal from the first digital word is supplied to the gate of the NMOS transistor 198, via inverter 206 as a $\overline{\text{Bit}\_a}$ signal, while the Bit_a signal is supplied to the gate of the PMOS transistor 202. A Bit_b signal positionally corresponds to the Bit_a signal from the first digital word. The Bit_b signal is supplied to the other end of the first transistor pair 192.

The second transistor pair 194 is the same as the first transistor pair except that the Bit_a signal is supplied to the gate of the NMOS transistor 200, the $\overline{\text{Bit}\_a}$ signal is supplied to the gate of the PMOS transistor 204, and the $\overline{\text{Bit}\_b}$ signal is supplied to the other end of the second transistor pair 194 via inverter 208.

The combination of the first and second transistor pairs 192 and 194 perform an exclusive-or operation. When the Bit_a signal has a logical zero value and the Bit_b signal has a logical zero value, NMOS transistor 198 will turn on. The digital low Bit_b signal will pull the cmp_x signal to a logical zero value to indicate a match. When the Bit_a signal has a logical zero value and the Bit_b signal has a logical one value, PMOS transistor 202 will turn on and drive cmp_x signal to a logical one value to indicate a mismatch. When the Bit_a signal has a logical one value and the Bit_b signal has a logical zero value, the PMOS transistor 204 will turn on and drive the cmp_x signal to a logical one value to indicate a mismatch. When the Bit_a signal has a logical one value and the Bit_b signal has a logical one value, NMOS transistor 200 will turn on and drive cmp_x to a logical zero value to indicate a match.

In an alternate embodiment, the inverters 206, 208 are not used and the complements of the Bit_a and Bit_b signals, $\overline{\text{Bit}\_a}$ and $\overline{\text{Bit}\_b}$, are supplied from an external source.

The Composite Match Detector Circuit

Figure 6:
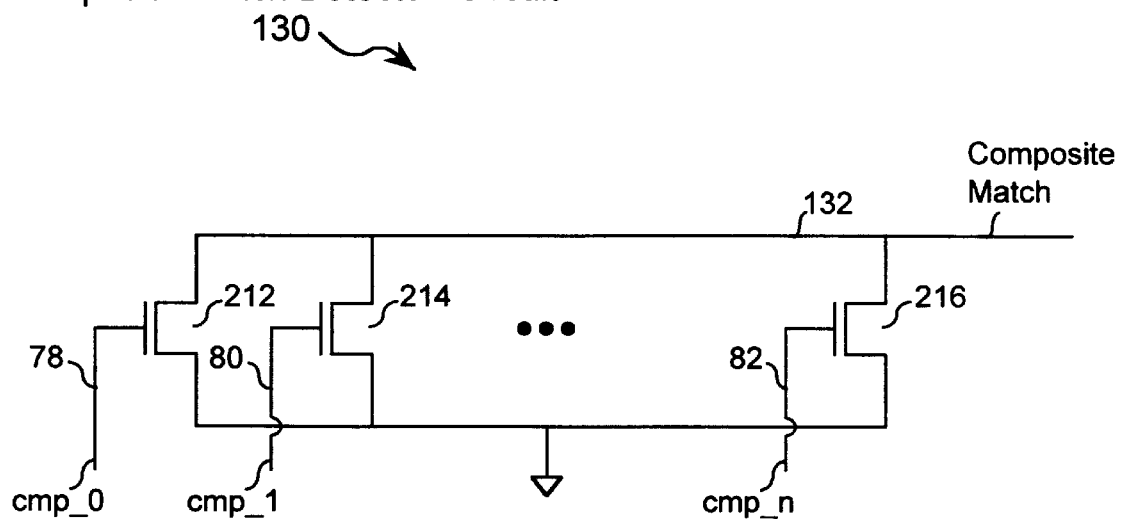
FIG. 6 illustrates a composite match detector circuit constructed in accordance with an embodiment of the invention shown in FIG. 3.

FIG. 6 illustrates a composite match detector circuit 130 constructed in accordance with an embodiment of the invention shown in FIG. 3. The composite match signal on line 132 is precharged to a digital high value. The line 132 stays high unless pulled low by a pull-down transistor 212–216 which occurs when at least one of the bits does not match.

In particular, the composite match detector circuit 130 has a set of NMOS transistors 212, 214 and 216, connected in parallel, to generate the composite match signal on line 132. The gate of each NMOS transistor 212, 214 and 216 connects to one of the comparison signals, cmp_0, cmp_1, and cmp_n, from the bit compare circuits on lines 78, 80 and 82, respectively. When any one of the comparison signals, cmp_0, cmp_1, and cmp_n, has a logical one value which indicates a mismatch, the composite match signal is pulled to a logical zero value on line 132.

The Last Bit Detector Circuit

Figure 7:
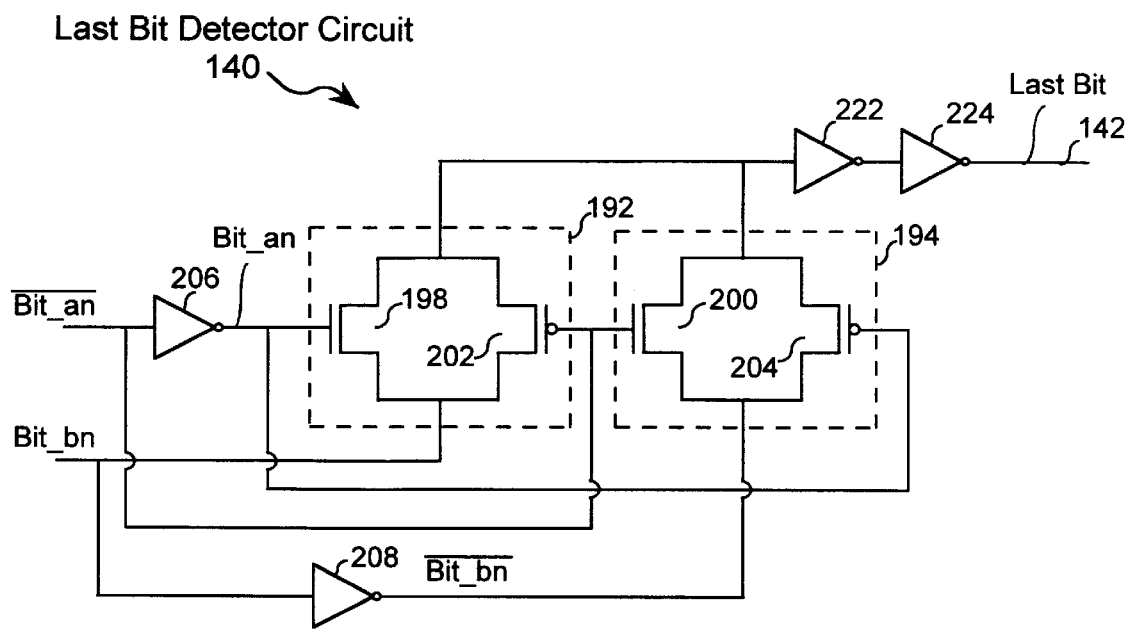
FIG. 7 illustrates a last bit detector circuit constructed in accordance with an embodiment of the invention shown in FIG. 3.

FIG. 7 illustrates a last bit detector circuit 140 constructed in accordance with an embodiment of the invention shown in FIG. 3. The last bit detector circuit 140 is an exclusive-nor gate. The last bit detector circuit 140 is implemented using the same bit compare circuit shown in FIG. 5 except that the complementary $\overline{\text{Bit\_an}}$ signal is input directly to inverter 206 instead of the Bit_an signal. In addition, two inverters 222 and 224 on the output provide a sufficient amount of delay for the last of the compared of the bit signals, typically Bit_an, to propagate through the bit compare circuit n 76 (FIG. 3) and the composite match detector circuit 130 (FIG. 3) such that the last bit signal is generated after the composite match signal reaches a stable logical value. In an alternate embodiment, no separate bit compare circuit is used, but the same bit compare circuit that generates the cmp_n signal is used and the cmp_n signal is supplied directly to the inverter 224.

Another Embodiment of the Digital Word Comparator

Figure 8:
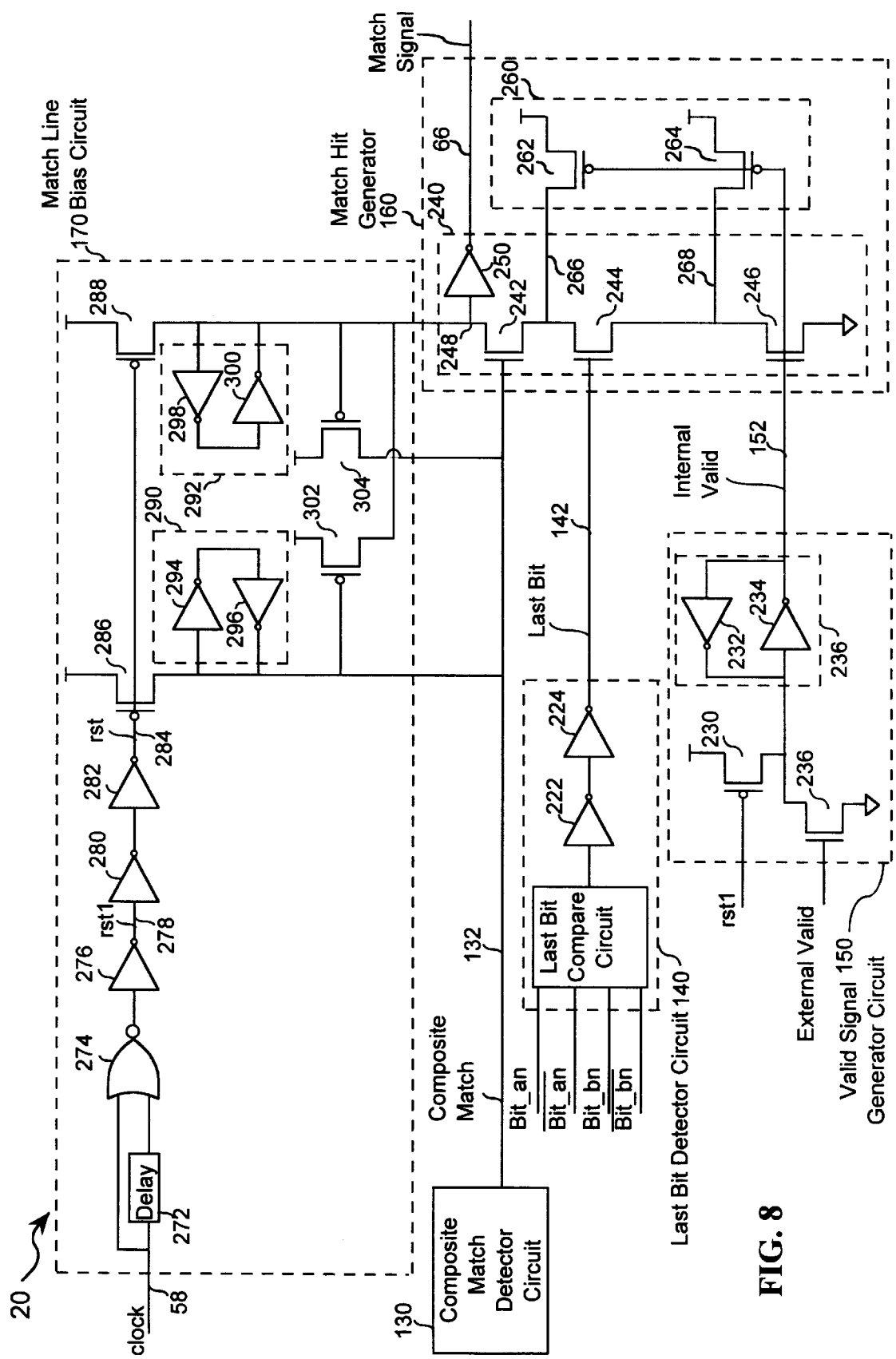
FIG. 8 illustrates another exemplary digital word comparator constructed in accordance with an embodiment of the invention shown in FIG. 3.

FIG. 8 illustrates another embodiment of the digital word comparator constructed in accordance with the embodiment of the invention shown in FIG. 3. In particular, FIG. 8 illustrates an exemplary valid signal generator circuit 150, a match hit generator 160 and a match line bias circuit 170.

The Valid Signal Generator Circuit

In the valid signal generator circuit 150, an external valid signal and a reset one (rst1) signal are received. The reset one signal is supplied by the match line bias circuit 170 and is used to precharge the valid signal generator circuit 150. The reset one signal is a pulse with a logical zero value that is supplied to the gate of PMOS transistor 230. In response to the reset one signal, PMOS transistor 230 applies a logical one value to the pair of cross-coupled inverters 232, 234 which act as a latch 236. In response, the latch 236 outputs a logical zero value on line 152. Therefore, the valid signal generator circuit 150 is precharged and the internal valid signal has a logical zero value.

When the reset one signal returns to a logical one value and the external valid signal on line 62 has a logical one value, NMOS transistor 236 turns on and pulls the input node to the latch 236 to a logical low value. In response, the latch 236 changes state and outputs a logical one value on line 152. Thus, the internal valid signal has a logical one value.

The Match Hit Generator Circuit

In the match hit generator circuit 160, an output circuit 240 generates the match hit signal or match miss signal on line 66. In the output circuit 240, three NMOS transistors 242, 244, and 246, connected in series, act as a pull-down circuit under logical AND conditions. The output of the three NMOS transistors 242, 244, and 246, is on line 248, which is precharged to a logical one value, and supplied to an inverter 250.

The composite match signal, last bit signal, and internal valid signal are applied to the gates of the NMOS transistors 242, 244 and 246, respectively, and when these signals all have a logical one value, node 248 is pulled low, causing a digital low value at the input of the inverter 250. In response, the inverter 250 outputs a logical one value as a match hit signal.

When any one of the gates of the NMOS transistors 242, 244 and 246, has a logical zero value, the input to the inverter 250 remains at a logical one value and the inverter 250 continues to output a logical zero value on line 66, indicating a match miss.

A stabilizer circuit 260 is coupled to the three transistors 242, 244, and 246, of the output circuit 240 to prevent charge sharing, thereby preventing false hit signals. The gates of the two PMOS transistors 262, 264 are connected to the internal valid signal. When the internal valid signal has a logical zero value, the PMOS transistors 262, 264 are turned on and thereby supply a logical one value on lines 266 and 268. When nodes 266 and 268 are at the same potential, there will be no charge leakage across the series transistors 242, 244 and 246.

The Match Line Bias Circuit

Since the comparator circuit of the present invention is preferably a dynamic circuit having a precharge phase and an evaluation phase, the match line bias circuit 170 is used to initialize various components to predetermined logical values during the precharge phase. In the match line bias circuit 170, the clock signal is supplied to a delay line 272 which outputs a delayed clock signal. A NOR gate 274 receives the clock signal and the delayed clock signal and generates a pulse having a logical one value when the clock signal and delayed clock signal have a logical zero value, otherwise the NOR gate 274 outputs a logical zero value. The output of the NOR gate is applied to inverter 276 which outputs an inverted pulse on line 278 as a reset one (rst1) signal. The reset one signal is supplied to inverters 280 and 282 which further delay the reset one signal, and output the delayed reset one signal on line 284 as a reset (rst) signal.

The reset signal initiates a precharge phase during which various components of various circuit are initialized to predetermined values. After the components are initialized and the reset signal is released or driven to a complementary state, the comparison is performed during the evaluation phase.

The reset signal is a negative pulse which is applied to the gate of PMOS transistors, 286 and 288. When the reset signal has a logical zero value, a logical one value is applied to line 132 and line 248. Two latches 290, 292, latch the logical one value to reduce the sensitivity of line 132 to noise (improve the S/N ratio). Each of the two latches 290, 292 has a pair of cross-coupled inverters 294 and 296, 298 and 300, respectively.

During the evaluation phase, if the composite match signal has a logical zero value, indicating a mismatch, PMOS transistor 302 turns on and applies logical one value to the input of the inverter 250 which continues to output a logical zero value.

When a match exists and line 248 is pulled down to a logical zero value by NMOS transistors 242, 244 and 246, latch 292 will change state and store the logical zero to improve noise sensitivity of line 248. In addition, PMOS transistor 304 turns on an applies a logical one value to line 132, thereby forcing the composite match signal at the gate of the NMOS transistor 242 to a logical one value and thereby further improving the sensitivity of the comparator circuit to noise. In particular, while the PMOS transistor 304 is turned on, if the output of the composite match detector circuit fluctuates within a predetermined range, the composite match signal on line 132 will tend to remain at the logical one value.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A circuit for comparing two digital words, comprising:
   a set of bit compare circuits generating a set of compare signals, each bit compare circuit receiving a first bit from a first digital word and a corresponding bit from a second digital word, each bit compare circuit generating one compare signal of said set of compare signals that indicates a match between said first bit and said corresponding bit;
   a composite match detector circuit generating a composite match signal in response to said set of compare signals;
   a last bit detector circuit generating a last bit signal that indicates a match between a last bit from said first digital word and a last bit from said second digital word; and
   a match hit generator circuit generating a match hit signal based on said composite match signal and said last bit signal when said last bit signal is received.

2. The circuit of claim 1 further comprising a valid signal generator circuit generating a valid signal, wherein said match hit signal is generated based on said valid signal.

3. The circuit of claim 1 further comprising a match line bias circuit coupled to said match hit generator and said composite match detector circuit.

4. The circuit of claim 3 wherein said match line bias circuit includes a dynamic precharge circuit.

5. The circuit of claim 4 wherein said match line bias circuit includes a latch for increasing the immunity of said composite match signal to noise.

6. The circuit of claim 1 wherein each of said bit compare circuits performs an exclusive-or operation between said first bit and said corresponding bit to generate said bit compare signal.

7. The circuit of claim 1 wherein each of said bit compare circuits receives said first bit and said corresponding bit, and also processes a complement of said first bit and a complement of said corresponding bit, each of said bit compare circuits including a first NMOS transistor connected in parallel with a first PMOS transistor, and a second NMOS transistor connected in parallel with a second PMOS transistor, said first NMOS transistor receiving said complement of said first bit, said first PMOS transistor receiving said first bit, said first NMOS transistor and said first PMOS transistor also receiving said corresponding bit, said second NMOS transistor receiving said first bit, said second PMOS transistor receiving said complement of said first bit, said second NMOS transistor and said second PMOS transistor also receiving said complement of said corresponding bit, said bit compare signal being output by said first NMOS transistor, said first PMOS transistor, said second NMOS transistor and said second PMOS transistor.

8. The circuit of claim 1 wherein said composite match detector circuit includes a plurality of transistors connected in parallel, each gate of each transistor receiving one of said compare signals, each transistor selectively controlling the value of said composite match signal.

9. The circuit of claim 1 wherein said match hit generator is a logical AND circuit receiving said composite match signal, said last bit signal and said valid signal.

10. The circuit of claim 9 wherein said match hit generator includes a first, a second and a third transistor, connected in series, said first transistor receiving said composite match signal, said second transistor receiving said last bit signal, and said third transistor receiving said valid signal.

11. The circuit of claim 1 further comprising an anti-charge sharing circuit coupled to said match hit generator to prevent false hits from being generated.

12. The circuit of claim 1 wherein said last bit detector circuit executes in an exclusive-nor operation between said last bit from said first digital word and said last bit from said second digital word.

13. A circuit for comparing two digital words comprising:
    a set of exclusive-or gates receiving a first digital word having a first set of bits and a second digital word having a second set of bits, comparing each bit of said first set of bits and said second set of bits, and generating a set of bit compare signals, one bit compare signal for each pair of compared bits, wherein each pair of compared bits includes one bit from said first digital word and a corresponding bit from said second digital word;
    a comparator block receiving said set of bit compare signals and generating a composite match signal indicating whether all bit compare signals of said set of bit compare signals match;
    a last bit detection circuit for generating a last bit signal having a logical one value when a last bit of said first digital word and a last bit of said second digital word match; and
    a match hit generator for generating a match hit signal when said last bit signal has said logical one value and said composite match signal has said logical one value.

14. A computer system comprising:
    a memory; and
    a processor coupled to said memory, said processor having:
        an internal cache; and
        a comparator circuit including:
            a set of bit compare circuits generating a set of compare signals, each bit compare circuit receiving a first bit from a first digital word from said internal cache and a corresponding bit from a second digital word from said internal cache, each bit compare circuit generating one compare signal of said set of compare signals that indicates a match between said first bit and said corresponding bit;
            a composite match detector circuit generating a composite match signal in response to said set of compare signals;
            a last bit detector circuit generating a last bit signal that indicates a match between a last bit from said first digital word and a last bit from said second digital word; and a match hit generator circuit generating a match hit signal based on said composite match signal and said last bit signal when said last bit signal is received.

15. The circuit of claim 14 wherein said comparator further includes a valid signal generator circuit generating a valid signal, wherein said match hit signal is generated based on said valid signal.

16. The circuit of claim 14 wherein said comparator further includes a match line bias circuit coupled to said match hit generator and said composite match generator.

17. The circuit of claim 16 wherein said match line bias circuit includes a dynamic precharge circuit.

18. A method of comparing and validating two digital words comprising the steps of:

generating a first comparison signal from a first digital word having a first set of bits and a second digital word having a second set of bits;

producing a last bit signal based on a match between a predetermined last bit of said first digital word and a corresponding last bit of said second digital word; and deriving a match hit signal based on said first comparison signal when said last bit signal is generated.

19. The method of claim 18 wherein said step of deriving said match hit signal is performed in response to a valid signal.

20. The method of claim 18 wherein said step of producing said last bit signal includes the step of executing an exclusive-nor operation between said predetermined last bit of said first digital word and said last bit of said second digital word.

* * * * *